United States Patent [19]
Tabler

[11] 3,853,748
[45] Dec. 10, 1974

[54] HYDROGENATION OF CYCLOPENTADIENE

[75] Inventor: Donald C. Tabler, Bartlesville, Okla.

[73] Assignee: Phillips Petroleum Company, Bartlesville, Okla.

[22] Filed: Nov. 5, 1969

[21] Appl. No.: 874,207

[52] U.S. Cl.......... 208/255, 260/666 A, 260/681.5, 208/144
[51] Int. Cl... C10g 23/06, C10g 31/14, C10g 37/10
[58] Field of Search ............ 208/143, 144, 255, 48; 260/666 A, 681.5

[56] References Cited
UNITED STATES PATENTS

| | | | |
|---|---|---|---|
| 1,915,592 | 6/1933 | Black et al.......................... | 208/143 |
| 2,038,614 | 4/1936 | Stevens et al...................... | 208/255 |
| 2,038,614 | 4/1936 | Stevens et al...................... | 208/255 |
| 2,376,426 | 5/1945 | Frey et al.......................... | 260/681.5 |
| 2,397,580 | 6/1940 | Ward................................. | 260/666 |
| 2,848,522 | 8/1958 | Gilmore............................. | 260/683 |
| 3,094,481 | 6/1963 | Butler et al....................... | 208/255 |
| 3,124,526 | 3/1964 | Butler et al....................... | 208/264 |
| 3,161,586 | 12/1964 | Watkins............................. | 208/264 |
| 3,296,120 | 1/1967 | Doelp et al....................... | 208/143 |
| 3,439,060 | 4/1969 | Kempton ........................ | 260/681.5 |
| 3,448,039 | 6/1969 | Tarhan............................... | 208/255 |
| 3,493,492 | 2/1970 | Sze.................................... | 208/255 |

Primary Examiner—Delbert E. Gantz
Assistant Examiner—Juanita M. Nelson

[57] ABSTRACT

Hydrogenation feedstock containing cyclopentadiene and dicyclopentadiene which is to be selectively hydrogenated to cyclopentene is vaporized at a temperature above that at which substantial formation of high boiling resin or resinlike residues occurs, prior to the introduction of the feedstock into the hydrogenation zone.

9 Claims, 2 Drawing Figures

INVENTOR.
D. C. TABLER
BY
Young and Quigg
ATTORNEYS

HYDROGENATION OF CYCLOPENTADIENE

This invention relates to the hydrogenation of cyclopentadiene.

Cyclopentene is a valuable monomer which can be polymerized to yield synthetic rubber materials. Synthetic rubbers prepared from cyclopentene have particular utility in the manufacture of long wearing tire treads.

Cyclopentene can be prepared by the selective hydrogenation of mixtures containing cyclopentadiene and dicyclopentadiene. This hydrogenation is preferably carried out in the vapor phase. This requires vaporization of the feed stream to the hydrogenation reactor. Serious problems have been encountered in vaporizing hydrogenation feed streams containing cyclopentadiene and dicyclopentadiene in that fouling of the heating zone occurs due to the formation of high boiling residue or polymeric materials such as resin or resinlike materials. In some instances it has been observed that deposition of a hard resinlike material in the catalyst bed occurs with time.

The present invention provides a solution to the above problems. I have now discovered that when a feedstock comprising cyclopentadiene and dicyclopentadiene is to be vaporized and is heated to a temperature above that at which substantial formation of said high boiling residues or polymeric materials normally occurs the formation of said high boiling residues or polymeric materials can be avoided, or at least markedly reduced. This was surprising because higher temperatures usually accelerate such resin-forming reactions and merely aggravate the problem. The temperature to which such feedstocks should be so heated will depend upon the composition of the feedstock. Preferably, for most feedstocks, said temperature will be in the order of at least about 700°F.

An object of this invention is to provide an improved process for the hydrogenation of cyclopentadiene to cyclopentene. Another object of this invention is to provide an improved method for vaporizing the feedstock in a process for the selective hyrogenation of cyclopentadiene to cyclopentene. Another object of this invention is to avoid, or at least reduce, the formation of resins or resinlike materials in the vaporization of hydrogenation feedstocks containing cyclopentadiene and discyclopentadiene. Other aspects, objects and advantages of the invention will be apparent to those skilled in the art in view of this disclosure.

Thus, according to the invention, there is provided a process for heating a mixture comprising cyclopentadiene and dicyclopentadiene so as to minimize formation of high boiling resin or resinlike residues during said heating, which process comprises heating said mixture to a temperature above that at which substantial formation of said residues normally occurs; and separating from said heated mixture a high boiling liquid residue having less volume and a lower viscosity than if said mixture had been heated to a lower temperature at which substantial formation of said residues occurs.

Cyclopentadiene forms an equilibrium mixture with its dimer, dicyclopentadiene. The composition of the resulting mixture, or ratio of cyclopentadiene to dicyclopentadiene in such mixtures depends upon the pressure and temperature conditions. The following Table I illustrates this equilibrium as measured in the vapor phase at a concentration of about 8 percent cyclopentadiene-dicyclopentadiene, the remainder being inert diluent to simulate the conditions in a cyclopentadiene hydrogenation reactor. The concentrations in Table I are expressed on a diluent-free basis for easier interpretation.

TABLE I

| Temp., °F. | Press., Atm. | Mol % Cyclopentadiene | Mol % Dicyclopentadiene |
|---|---|---|---|
| 300 | 11 | 68.5 | 31.5 |
| 350 | 11 | 87.0 | 13.0 |
| 400 | 11 | 93.5 | 6.5 |
| 450 | 11 | 97.5 | 2.5 |
| 500 | 11 | 99.3 | 0.7 |
| 550 | 11 | >99.5 | <0.5 |
| 300 | 29 | 51.4 | 48.6 |
| 350 | 29 | 71.0 | 29.0 |
| 400 | 29 | 85.5 | 14.5 |
| 450 | 29 | 94.5 | 5.5 |
| 500 | 29 | 98.0 | 2.0 |
| 550 | 29 | >98.0 | <2.0 |

The data in the above Table I show that increasing temperatures shifts the equilibrium in the direction of cyclopentadiene. At ordinary ambient temperature and pressure (75° to 100° F. — approximately 1 atmosphere), such as exists in ordinary storage, the equilibrium mixture will contain more than 99 percent dicyclopentadiene. Thus, it is necessary to heat the mixture to shift the equilibrium toward cyclopentadiene which can be hydrogenated to cyclopentene. Since it is usually desirable to heat the feedstock to a temperature within the range of about 400° to about 550° F. for the hydrogenation reaction, the above tabulation would indicate there would be no problem in heating cyclopentadiene-dicyclopentadiene containing mixtures to the desired temperature for selective hydrogenation.

However, cyclopentadiene and dicyclopentadiene when heated have a strong tendency to polymerize to resin or resinlike materials. At temperatures in the order of 450° to 500° F. the amount of polymeric residue which remains unvaporized when the feedstock is vaporized is too great for economical operation. At temperatures in the order of about 650°F. the amount of unvaporized residue is decreased, but said residue attains a very viscous to semisolid condition. This resin or resinlike material fouls or plugs the heater equipment, or at best is very difficult to drain from the heating and vaporizing equipment.

I have discovered that when mixtures containing cyclopentadiene and dicyclopentadiene are heated to temperatures above that at which substantial formation of said high boiling residues or polymeric materials normally occurs the polymeric reactions involving cyclopentadiene and dicyclopentadiene are apparently reversed. This is shown by the fact that the residue is greatly reduced in volume, is much reduced in viscosity, and can be readily drained from the vaporizer equipment. Furthermore, there is no tendency for fouling of the vaporizer equipment by the formation of hard deposits of such materials.

Thus, in accordance with the invention, hydrogenation feedstocks containing cyclopentadiene and dicyclopentadiene are heated to a temperature above that at which substantial formation of high boiling resin or resinlike materials occurs. Generally speaking, said temperature will preferably be at least about 700° F., more preferably at least about 750° F., when vaporizing said feedstocks prior to introduction thereof to the hydrogenation reaction zone. The temperature range of about 750° to about 800° F. has been found to give excellent results.

The cyclopentadiene and dicyclopentadiene mixtures used in the practice of the invention can be obtained from any convenient and suitable source. If desirable and available, substantially pure mixtures of cyclopentadiene and dicyclopentadiene can be used. Convenient and economical sources of cyclopentadiene and dicyclopentadiene in many instances are by-product streams recovered from the thermal or catalytic cracking of paraffinic hydrocarbons, and naphthas. Such materials are cracked in large quantities for the production of olefinic raw materials, gasolines, etc. For example, propane is cracked for the production of ethylene, the monomer for the manufacture of polyethylene. Naphthas are cracked for the production of ethylene and gasoline. In such processes, in addition to the desired product(s), there are formed, by reaction mechanisms not completely understood, considerable quantities of cyclic compounds, diolefins, aromatic compounds such as benzene and toluene, and heavy or high boiling complex aromatic compounds. In conventional recovery schemes these materials are sometimes recovered as a debutanized concentrate, it being desirable to separately recover the more valuable lighter hydrocarbons such as butane and lighter. Such a stream is sometimes referred to as a debutanized aromatic concentrate stream. U.S. Pat. No. 2,848,522, issued to F. E. Gilmore on Aug. 19, 1958, is illustrative of one such process. In some instances a "raw" $C_5$ stream containing cyclopentadiene and dicyclopentadiene is recovered. The analyses given below are representative of such streams.

TABLE II

Typical Compositions of Streams Which Contain Cyclopentadiene

|  | Total DAC* | Raw $C_5$ from Naphtha Cracker |
|---|---|---|
| Cyclopentane | 0.04 | — |
| Cyclopentene | 1.7 | 3–7 |
| Isoprene | 3.4 | 9–13 |
| t-Piperylenes | 2.4 | (10–14 |
| c-Piperylenes | 1.3 | ( |
| Cyclopentadiene ) Dicyclopentadiene) | 15–20 | 24–28 |
| Benzene | 48.2 | — |
| Toluene | 8.1 | — |
| Other Components | 16.9 | — |

*Debutanized aromatic concentrate

It will be noted the above streams contain some isoprene and piperylenes. These diolefins can contribute to the above-discussed problem of polymer formation, either alone or by reaction with cyclopentadiene and/or dicyclopentadiene. While it is not intended to limit the invention by any theories as to the reaction mechanism involved, it is presently believed a reaction mechanism of the Diels Alder type is involved.

Figure 1:
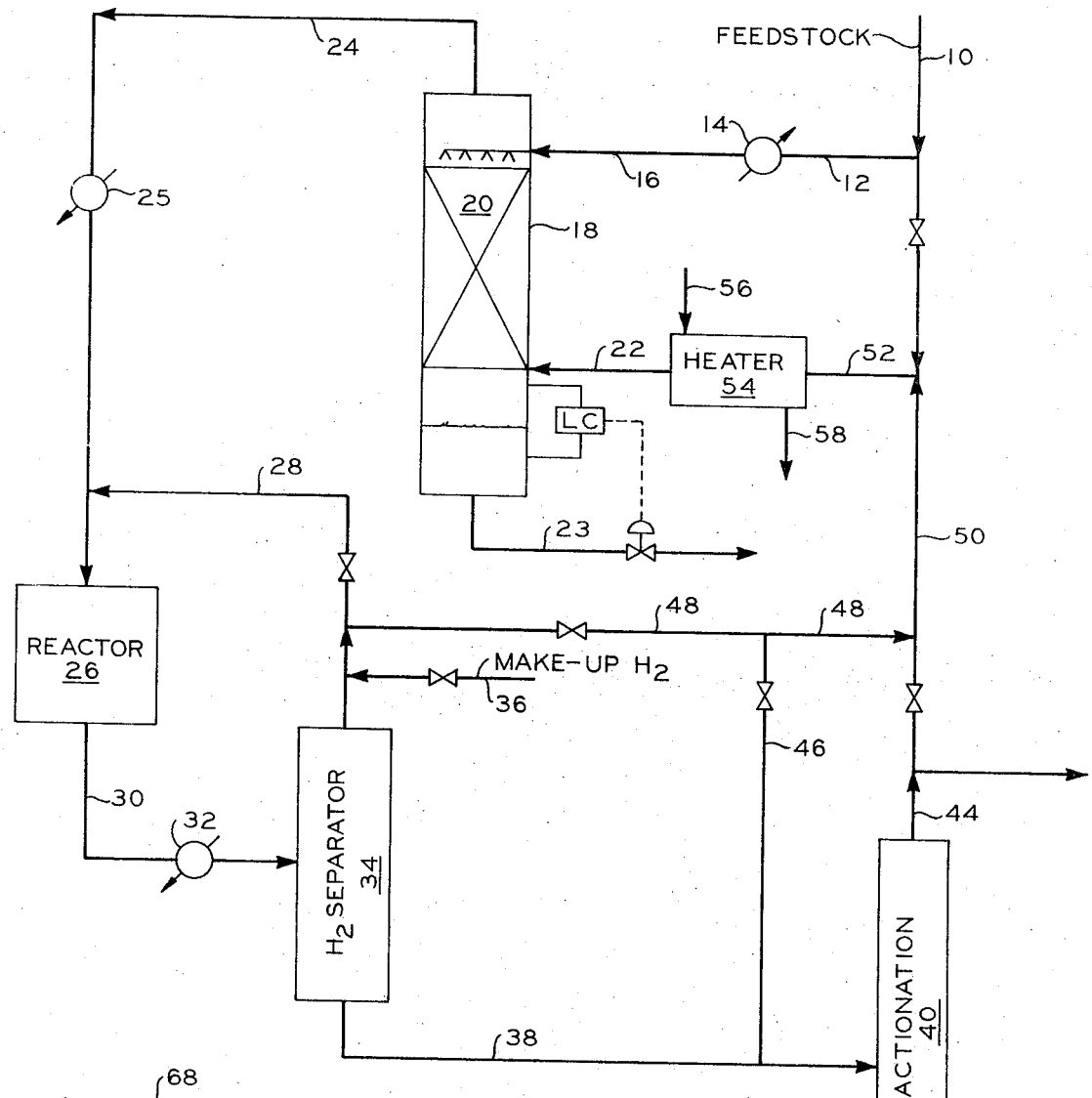
FIG. 1 is a diagrammatic flow sheet illustrating various embodiments of the invention.

Referring now to the drawings, the invention will be more fully explained. It will be understood that many valves, control instruments, etc., not necessary for explanation of the invention, have been omitted. In FIG. 1 a feedstock comprising cyclopentadiene and dicyclopentadiene is introduced via conduit 10, and passed through conduit 12 into preheater 14 wherein it is heated to a temperature within the range of about 150° to 350° F., preferably about 200° to about 300° F. Said feedstock can be preheated to said temperatures without excessive formation of said polymeric or resinlike residues. Said preheated feedstock is then passed via conduit 16 into contactor-vaporizer 18. Said vaporizer 18 can be any suitable type of apparatus for contacting the feedstock to be vaporized with the medium used to vaporize said feedstock. As here shown, said vaporizer comprises a tower containing a bed 20 of any suitable type of packing material such as berl saddles, raschig rings, etc. If desired, said tower 18 can comprise a bubble cap tower. The preheated feedstock, in some instances at least partially vaporized, enters said vaporizer 20 where it flows down over the packing therein and is contacted countercurrently with a stream of hot vaporous hydrogenated product from conduit 22, obtained as described hereinafter. Said hot vaporous product from conduit 22 will be introduced in an amount and at a temperature sufficient to heat said feedstock to a temperature of at least 700° F., preferably at least 750° F. The unvaporized portion of said feedstock flows through the packing of vaporizer 18, collects in the bottom of the vessel as indicated, and is withdrawn therefrom via conduit 23. A liquid level of the unvaporized residue or heavy ends can be maintained in the bottom of vaporizer 18 by means of the level control and valve arrangement shown. The pressure in vaporizer 18 can be any suitable pressure. Usually said pressure will be within the range of 50 to 500 psig.

The vaporized portion of the feedstock is withdrawn from vaporizer 18 via conduit 24, passed through cooler 25, and then passed into hydrogenation reactor 26. Hydrogen from conduit 28 can be admixed with said feedstock in conduit 24. If desired, said hydrogen can be introduced into reactor 26 separately. If necessary or desirable, said hydrogen can be heated by a suitable heating means, not shown.

Said reactor 26 contains a bed of catalyst which is selective for the hydrogenation of cyclopentadiene to cyclopentene. Said catalyst can be any catalyst which is selective for the hydrogenation of cyclopentadiene to cyclopentene. One such catalyst is a nickel sulfide on alumina containing about 10 weight percent nickel. Such a catalyst can be prepared in the form of nickel oxide on activated alumina and then converted to the active sulfide form by treatment with a stream of hydrogen sulfide at a temperature of about 750° F. and about one atmosphere pressure. Cyclopentadiene can be selectively hydrogenated to cyclopentene at a temperature within the range of 350° to 600°, preferably about 400° to about 550° F., depending upon the catalyst and the activity of the catalyst. The pressure in hydrogenator 26 will usually be within the range of 75 to 400, preferably 100 to 200 psig. As mentioned, an excess of hydrogen is used. Usually, the amount of hydrogen employed will be within the range of from about 5 to about 20 mols per mol of diolefin in the feedstock. Said feedstock is introduced into reactor 26 at a feed rate within the range of 0.5 to 5, preferably about 1 to about 3, liquid hourly space velocity. Effluent from reactor 26 is withdrawn via conduit 30, passed through cooler 32, and then introduced into hydrogen separator 34. Recycle hydrogen is withdrawn from separator 34 and passed via conduit 28 into the reactor 26 as described. Make-up hydrogen can be introduced via conduit 36.

Liquid reactor effluent or hydrogenated product is withdrawn from separator 34 via conduit 38 and introduced into fractionator 40 from which a stream comprising a benzene-toluene concentrate is withdrawn as a bottoms product via conduit 42. A cyclopentene concentrate stream is withdrawn overhead from fractionator 40 via conduit 44. A cyclopentene product can be recovered from the concentrate stream in conduit 44 by further fractionation or other suitable purification means, not shown, to produce a polymerization grade cyclopentene. A portion of the hydrogenated product stream in conduit 38 is withdrawn therefrom via conduit 46 and passed via conduits 48, 50, and 52 into heater 54. Usually the volume ratio of the hydrogenated product (conduit 46) to the fresh feed (conduit 16) will be in the range of 3:1 to 10:1, preferably 4:1 to 7:1. Said heater 54 can be any suitable type of heater. As here indicated, said heater can be a conventional shell and tube type heat exchanger with the hydrogenated product from conduit 52 being passed on the tube side and a heat exchange medium, such as Dowtherm, passed therethrough on the shell side via conduits 56 and 58. If desired, said heater 54 can be a conventional tube type furnace heated by gas or oil in conventional manner. Preferably, at least a portion of the hydrogen from separator 34 is passed via conduits 48, 50, and 52 into heater 54. This serves as a convenient means of heating the hydrogen and aids in the vaporization of the feedstock by reducing the bubble point thereof. Vaporized hydrogenated product is withdrawn from heater 54 via conduit 22 at a temperature sufficient to heat the feedstock in vaporizer 18 as described above, usually a temperature within the range of 800° to 1,000° F., and introduced into said vaporizer 18.

Figure 2:
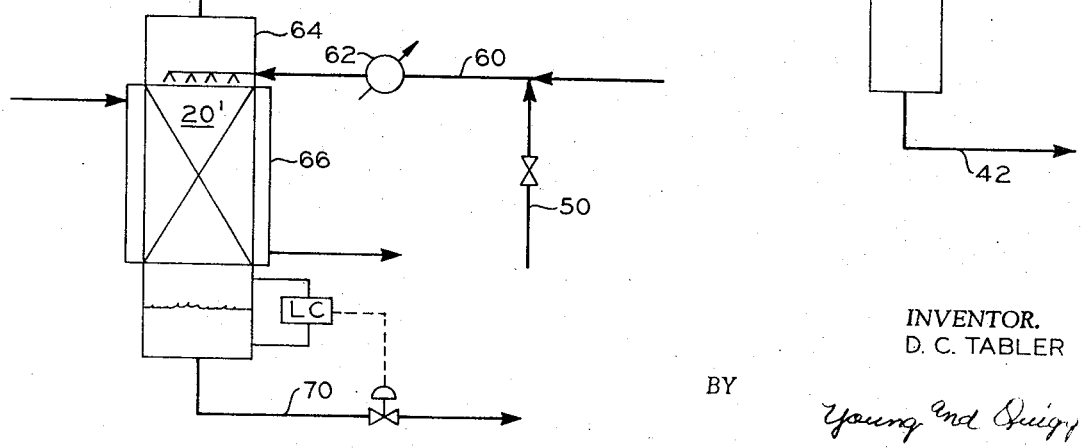
FIG. 2 is a diagrammatic illustration of another type of heating or vaporizing apparatus which can be employed in the practice of the invention.

Referring now to FIG. 2, there is illustrated another type of heater and vaporizer which can be employed in the practice of the invention. In FIG. 2, fresh feedstock is introduced via conduit 60, passed through preheater 62, and then introduced into heater-vaporizer 64. Said vaporizer 64 can comprise a tower filled with packing materials similarly as described above for vaporizer 18 in connection with FIG. 1. Vaporizer 64 can be a jacketed vessel as indicated for the introduction of hot heat exchange medium through jacket 66 by means of the inlet and outlet conduits shown. If desired, said vaporizer 64 can be heated by means of electrical heaters instead of the heating jacket as illustrated. Also, if desired, the packing material 20' can be omitted. Preheated feedstock is introduced into vaporizer 64, similarly as in FIG. 1, and flows down over the packing material 20' during which downflow it is heated to a temperature within the range of about 700° to about 800°, as described in connection with FIG. 1, and at least partially vaporized. Vaporized feedstock is withdrawn via conduit 68 for passage to hydrogenation reactor 26 as described above in connection with FIG. 1. Unvaporized feedstock or residue is withdrawn via conduit 70. When packing material 20' is omitted, the preheated feedstock is preferably introduced into vaporizer 64 by spraying the feedstock onto the hot walls of the vaporizer.

The following examples will serve to further illustrate the invention.

EXAMPLE I

A series of runs was carried out in a vaporizer substantially like that illustrated in FIG. 2 except that no packing material was employed therein. The vaporizer employed comprised an approximate 12-inch length of ½-inch stainless steel — Type 304 — Schedule 80 pipe surrounded by an electrical heater. Thermocouples were provided for measuring the temperature in the vaporizer. The vaporizer was operated at 75 psig pressure. A debutanized aromatic concentrate feedstock stream was introduced into the top of the vaporizer and onto the hot walls thereof. Said feedstock was not preheated. Hydrogen in the amount of 2,780 standard cubic feet per barrel of feedstock was included along with said feedstock. The composition of the feedstock, other operating conditions in the vaporizer, and the results of vaporizing said feedstock at different temperatures are set forth in Table III below. The vaporized feedstock from Run No. 5 was hydrogenated over a nickel sulfide on alumina catalyst containing 10 percent nickel. Operating conditions and tests on the hydrogenated product are set forth in Table IV below.

EXAMPLE II

Another series of runs was carried out in the vaporizer employed in Example I. In this series of runs the vaporizer was again operated at 75 psig pressure. The debutanized aromatic concentrate feedstock was diluted with an equal volume of hydrogenated product obtained by the selective hydrogenation of such a feedstock under conditions described hereinafter. Hydrogen in the amount of 1,390 standard cubic feet per barrel of feedstock was included along with the feedstock passed to said vaporizer. The composition of the feedstock to vaporizer, other operating conditions for the vaporizer, and results obtained in heating and vaporizing said feedstock at different temperatures are set forth in Table III below. The vaporized feedstock from Run No. 4 was hydrogenated over a nickel sulfide on alumina catalyst containing 10 percent nickel. Operating conditions and tests on the hydrogenated product are set forth in Table IV below.

TABLE III

| Feedstock Composition - Wt. % | Example I | Example II |
|---|---|---|
| t-butene-2 | 0.11 | 0.04 |
| c-butene-2 | 0.01 | 0.08 |
| 3-methylbutene-2 | 0.12 | 0.11 |
| Pentene-1 | 2.04 | 1.05 |
| 2-methylbutene-1 | 0.14 | 0.20 |
| t-pentene-2 | 0.41 | 1.38 |
| c-pentene-2 | 0.23 | 0.65 |
| 1,4-pentadiene | 0.63 | 0.33 |
| 2-methylbutene-2 | 0.13 | 0.70 |
| Cyclopentane | 0.20 | 0.29 |
| Isoprene | 2.21 | 1.13 |
| Cyclopentene | 1.57 | 7.46 |
| t-pentadiene-1,3 | 1.74 | 0.84 |
| c-pentadiene-1,3 | 1.15 | 0.56 |
| Cyclopentadiene ) Dicyclopentadiene) | 14.40 | 6.81 |
| Benzene | 52.83 | 60.59 |
| Toluene | 10.86 | 10.69 |
| Others (not identified) | 11.22 | 7.09 |

| Example I | Vaporizer Temp., °F. | Vaporizer Residue Wt. % of Feed | Vaporizer Residue, Properties |
|---|---|---|---|
| Run No. 1 | 450 | 39.4 | Low viscosity liquid |
| Run No. 2 | 500 | 22.9 | do. |

TABLE III-Continued

| Feedstock Composition - Wt. % | | Example I | Example II |
|---|---|---|---|
| Run No. 3 | 650 | 12.3 | High viscosity to semisolid |
| Run No. 4 | 750 | 6.9 | Low viscosity liquid |
| Run No. 5 | 800 | 2.9 | do. |
| Example II | | | |
| Run No. 1 | 500 | 12.1 | Low viscosity liquid |
| Run No. 2 | 650 | 3.16 | High viscosity to semisolid |
| Run No. 3 | 750 | 1.21 | Low viscosity liquid |
| Run No. 4 | 800 | 0.77 | do. |

TABLE IV

| Hydrogenation Reactor Conditions | Example I | Example II |
|---|---|---|
| Temp., °F. | 548 | 540 |
| Pressure, psig | 75 | 75 |
| Feed rate, LHSV | 1.0 | 2.0 |
| Hydrogen Flow Rate | | |
| SCF/bbl feed | 2780 | 1390 |
| mols/mol diolefin | 9.3 | 9.7 |
| Hydrogenated Product Composition - Wt. % | Example I | Example II |
| t-butene-2 | 0.24 | 0.21 |
| c-butene-2 | 0.08 | 0.06 |
| 3-methylbutene-2 | 0.12 | 0.09 |
| Pentene-1 | 0.56 | 0.49 |
| 2-methylbutene-1 | 0.44 | 0.37 |
| t-pentene-2 | 3.43 | 2.80 |
| c-pentene-2 | 1.48 | 1.17 |
| 2-methylbutene-2 | 1.77 | 1.42 |
| Cyclopentane | 0.63 | 0.37 |
| Cyclopentene | 17.61 | 13.81 |
| Cyclopentadiene ) Dicyclopentadiene ) | 1.21 | 0.85 |
| Benzene | 48.75 | 57.74 |
| Toluene | 11.56 | 11.91 |
| Others (not identified) | 12.12 | 8.71 |

The data in the above Table III clearly illustrate the unexpected advantages obtained when a feedstock comprising cyclopentadiene and dicyclopentadiene is vaporized at a temperature above about 700° F. At a temperature within the range of 450° to 500° F. the unvaporized portion of the feedstock which was withdrawn from the bottom of the vaporizer was a low viscosity liquid, but was excessive in the volume thereof. At a temperature of about 650° F. the unvaporized portion of the feedstock withdrawn from the bottom of the vaporizer, while reduced in volume, was a high viscosity to semisolid liquid which was extremely difficult to handle. A 750° F. and above, the unvaporized portion of the feedstock was again a low viscosity liquid, was still further reduced in volume, and could be readily drained from the bottom of the vaporizer. As used herein, the term "low viscosity liquid" refers to a liquid having a viscosity in the order of that of water, or slightly greater, e.g., in the order of 1 to 5 centipoises. As used herein, the term "high viscosity" refers to a thick molasseslike liquid having a viscosity in the order of about 1,000 centipoises, or greater.

The data given above for the runs in Example II also illustrate the benefits or advantages obtained when the feedstock is diluted with hydrogenated product. It will be noted there is a marked reduction in the amount of vaporizer residue. It will also be noted that this reduction is more than the 50 percent reduction such as would be expected by the 50 percent dilution employed in these examples. While it is not intended to limit the invention by any theories as to the operation thereof, it is presently believed that dilution of the feedstock with the hydrogenated product aids in shifting the equilibrium toward the decomposition of the polymeric resin or resinlike material which forms from cyclopentadiene and dicyclopentadiene and/or the other diolefins present. It is also believed the presence of the hydrogen in the vaporizer also aids in shifting said equilibrium.

While certain embodiments of the invention have been described for illustrative purposes, the invention is not limited thereto. Various other modifications of the invention will be apparent to those skilled in the art in view of this disclosure. Such modifications are within the spirit and scope of the disclosure.

I claim:

1. In a process for the selective hydrogenation of a mixture comprising cyclopentadiene and dicyclopentadiene wherein said mixture is preheated in a heating zone in the absence of a catalyst to a given temperature within the range of about 400° to about 650° F. which is sufficient to carry out said selective hydrogenation, and at which said given temperature there is a substantial formation of a high boiling resin or resin-like residue which fouls said heating zone, the improvement comprising:

minimizing the formation of said residue during said heating step by heating said mixture in said heating zone in the absence of a catalyst to a greater temperature which is greater than said given temperature and substantially reducing the volume and viscosity of said residue;

separating said heated mixture into (a) a high boiling liquid residue having less volume and a lower viscosity than if said mixture had been heated only to said given temperature, and (b) a vaporous stream comprising cyclopentadiene; and cooling said vaporous stream to a temperature within the range of about 350° to about 600°F. prior to carrying out said selective hydrogenation.

2. A process according to claim 1 wherein said greater temperature is at least about 750°F.

3. A process according to claim 1 wherein: said mixture is a feedstock stream to a process for the selective hydrogenation of cyclopentadiene to cyclopentene, and is heated to a said greater temperature within the range of about 750° to about 800° F.

4. A process for the selective hydrogenation of cyclopentadiene to cyclopentene, which process comprises: heating a feed stream comprising cyclopentadiene, dicyclopentadiene, and high boiling aromatic compounds in the absence of a catalyst to a temperature of at least 700° F. so as to minimize the formation of high boiling residues which form when said stream is heated to a lower temperature in the range of about 450° to about 650° F.; separating said heated stream into (a) a high boiling liquid residue stream comprising said aromatic compounds and having a viscosity within the range of 1 to 5 centipoises, and (b) a vaporous stream comprising said cyclopentadiene; cooling said vaporous stream to a temperature in the range of about 350° to about 600° F.; passing said cooled vaporous stream to a hydrogenation zone; in said hydrogenation zone, selectively hydrogenating said cyclopentadiene to cyclopentene by contacting said vaporous stream, under selective hydrogenation conditions, with an excess of hydrogen and a catalyst capable of causing said selective hydrogenation; withdrawing a hydrogenated product effluent stream from said hydrogenation zone; and recovering a cyclopentene concentrate stream from said hydrogenated product effluent stream.

5. A process according to claim 4 wherein said feed stream is heated by contacting same in a contacting zone with a hot vaporous stream of said hydrogenated product.

6. A process according to claim 5 wherein the liquid volume ratio of said hydrogenated product stream to said feed stream in said contacting zone is in the range of 3:1 to 10:1.

7. A process according to claim 4 wherein: said feed stream is preheated in a heating zone in the absence of a catalyst to a temperature within the range of from about 250° to about 400° F.; said preheated feed stream is contacted countercurrently in a contacting zone in the absence of a catalyst with a hot vaporous stream of said hydrogenated product at a temperature and in an amount sufficient to further heat said preheated stream to said temperature of at least about 700° F.; said vaporous stream comprising cyclopentadiene, along with said hot vaporized hydrogenated product stream, is withdrawn from an upper portion of said contacting zone; and said high boiling liquid residue stream is withdrawn from a lower portion of said contacting zone.

8. A process according to claim 7 wherein the liquid volume ratio of said hydrogenated product stream to said feed stream introduced to said contacting zone is in the range of from 3:1 to 10:1.

9. A process according to claim 8 wherein at least a portion of the hydrogen passed to said hydrogenation zone is combined with said hot vaporous stream of hydrogenated product.

* * * * *